D. A. Morris,
Anti-Friction Box.
N°. 10,676.    Patented Mar. 21, 1854.
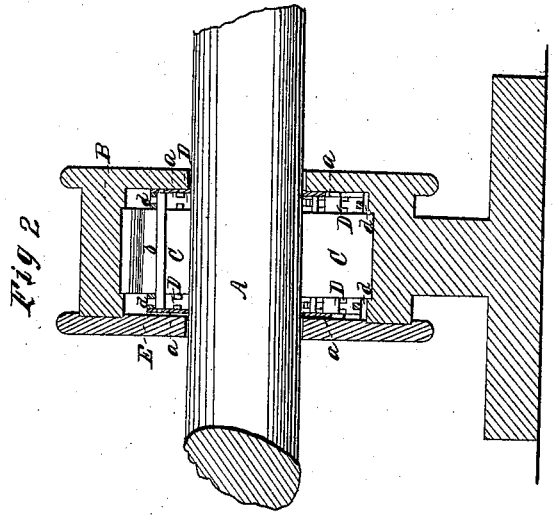
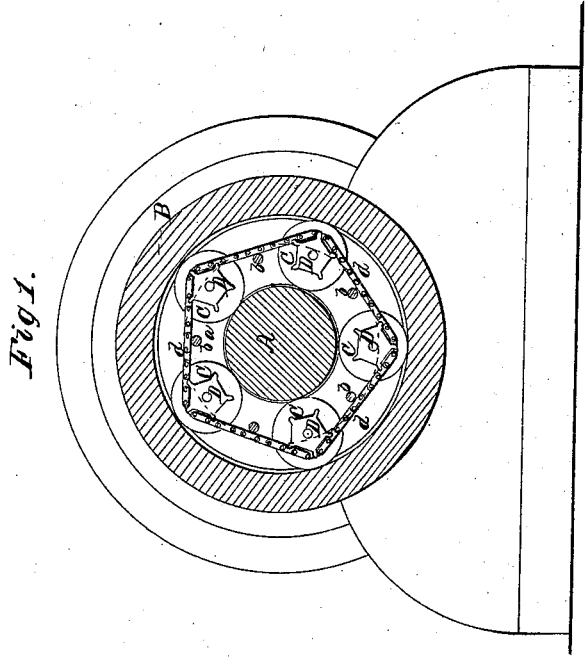

UNITED STATES PATENT OFFICE.

DAVID A. MORRIS, OF PITTSBURGH, PENNSYLVANIA.

ANTIFRICTION-BOX.

Specification of Letters Patent No. 10,676, dated March 21, 1854.

*To all whom it may concern:*

Be it known that I, DAVID A. MORRIS, of Pittsburgh, in the county of Allegheny and State of Pennsylvania, have invented a new and useful Improvement in Antifriction Axle and Journal Boxes; and I do hereby declare that the following is a full, clear, and exact description of the same, reference being had to the accompanying drawing, forming part of this specification, in which—

Figure 1, is a section of an axle and box, constructed according to my improvements, taken transversely to the axis. Fig. 2, is a section of the same, taken longitudinally to the axis.

Similar letters of reference indicate corresponding parts in both figures.

The anti-friction axle and journal box, as variously constructed, may be said to be a practical failure, owing to the unequal wear of the anti-friction rollers, caused by the occasional suspension or irregularity of their revolution. With a view to prevent this inequality in the wear of the rollers, and thereby render this description of box practically perfect, the nature of my invention consists in furnishing every roller of the series contained within the box with a similar toothed wheel at each or either end, and, surrounding the series of toothed wheels with an endless chain, properly constructed to engage with the teeth of the wheels. By this means, the rollers are all compelled to revolve together; and it is hardly possible that their peripheries can fail to preserve a uniform motion around their axes, at the same velocity as the periphery of the journal or axle around its axis, and so there will be no rubbing friction. An attempt has been made to obtain the result thus produced, by forming spur gear teeth on the axle, several friction rollers, and interior of the box, as described in the patent of Joseph Harris, Junr., of Feby. 22, 1848; but with that arrangement, the rollers are dependent for their proper operation upon two lines of gearing, one of which rotates with the shaft or axle; and the other of which is stationary in the box, and it has been found practically impossible to construct gearing, whose several parts will maintain a proper relation to each other for any length of time. By employing an endless chain, instead of the gear teeth on the axle and in the box, the rollers are made entirely free of the axle and box, except at those parts which form the bearing, and the difficulties attendant upon Joseph Harris, Jr.'s, arrangement is entirely obviated.

A, in the accompanying drawing, is the axle; and, B, is its box, which is bored out truly, and furnished with a cap, E, at its open end.

C, C, are the rollers, whose diameter is such as to fill the space between the axle and box; each one has pivots at each end, which fit easily in suitable holes, at equal distances apart, in two rings, $a$, $a$, which serve to keep the rollers at proper distance from, or prevent them touching each other. The two rings are attached to each other by stretcher rods, $b$, $b$, between the rollers.

D, D, are the toothed wheels, of which there is one at each end of each roller.

$d$, $d$, are the chains, which surround the series of rollers, and make them revolve together.

A set of wheels, D, D, and chain, $d$, at one end of the rollers, might in some cases be effective; but I prefer to use them at each end. It might also be possible, though not desirable, to place the wheels on some other part of the rollers.

I do not claim the employment, for the purpose of causing the rollers to revolve simultaneously and uniformly, of spur gear teeth on axle, several friction rollers, and interior of the box, as that is covered by the claim of Joseph Harris, Junr., of Feby. 22, 1848, but

What I claim as my invention, and desire to secure by Letters Patent, is,

Furnishing the series of anti-friction rollers, at one or both ends, or at any part of their length, with a series of toothed wheels, D, (one for each,) and an endless chain, $d$, substantially as and for the purpose described.

DAVID A. MORRIS.

Witnesses:
N. BUCKMASTER,
W. J. HOWARD, Jr.